United States Patent [19]

Kimball

[11] Patent Number: 5,278,805
[45] Date of Patent: Jan. 11, 1994

[54] SONIC WELL LOGGING METHODS AND APPARATUS UTILIZING DISPERSIVE WAVE PROCESSING

[75] Inventor: Christopher V. Kimball, West Redding, Conn.

[73] Assignee: Schlumberger Technology Corporation, New York, N.Y.

[21] Appl. No.: 966,762

[22] Filed: Oct. 26, 1992

[51] Int. Cl.$^5$ .............................................. G01V 1/40
[52] U.S. Cl. ....................................... 367/32; 367/31; 367/34
[58] Field of Search ....................... 367/34, 31, 25, 32; 364/422

[56] References Cited

U.S. PATENT DOCUMENTS 4,594,691 6/1986 Kimball et al. ........................ 367/32
5,077,697 12/1991 Chang .................................... 367/31

OTHER PUBLICATIONS

"Aquisition and Analysis of Sonic Waveforms from a Borehole and Dipole Source . . . " by Harrison et al. SPE 20557, pp. 267-282 Society of Petroleum Engineers, Inc. 1990.
"Semblance Processing of Borehole Acoustic Array Data" by Kimball et al. Geophysis, vol. 49, No. 3, Mar. 1984, pp. 274-281.
"Inversion of P and SV Waves from Multicomponent Offset Vertical Seismic Profiles" by Esmersoy Geophysics, vol. 55, No. 1, Jan. 1990, pp. 35-50.

Primary Examiner—Ian J. Lobo
Attorney, Agent, or Firm—David P. Gordon; Leonard W. Pojunas

[57] ABSTRACT

Methods and related apparatus for conducting shear slowness logging are set forth. The methods broadly comprise: detecting dispersive waves such as flexural or Stoneley waves; Fourier transforming the received signals; backpropagating the Fourier transformed signals according to equations using different dispersion curves; stacking the backpropagated signals; and finding semblances in order to choose the dispersion curve of maximum semblance and thereby identifying the shear slowness of the formation. Formation shear slowness may be plotted over borehole depth. Different embodiments are set forth. In one preferred embodiment (QDSTC), prior to Fourier transforming, the signals are stacked according to a previous estimation of slowness ($S_0$), and are windowed for maximum energy. The reduced set of data in the window are then extracted for Fourier transformation, and prior to backpropagation, multiplied by $S_0$ to reset them for backpropagation and stacking. In another preferred embodiment (DSTC), after the signals are backpropagated, the backpropagated signals are inverse fourier transformed and windowed. In DSTC, semblance values may be plotted as a function of slowness and time. Regardless of embodiment, the methods of the invention account for non-dispersive waves by using dispersion curves of constant value during backpropagation.

26 Claims, 5 Drawing Sheets

SONIC WELL LOGGING METHODS AND APPARATUS UTILIZING DISPERSIVE WAVE PROCESSING

BACKGROUND OF THE INVENTION

This invention relates generally to sonic well logging. More particularly, this invention relates to sonic well logging techniques useful in quantifying subsurface parameters which are helpful in searching for and exploiting hydrocarbons and other valuable resources. The invention has particular application to determining the shear slowness of a slow formation via utilization and processing of dispersive wave information such as flexural or Stoneley waves.

Sonic well logs are typically derived from tools suspended in a mud-filled borehole by a cable. The tools typically include a sonic source (transmitter) and a plurality of receivers which are spaced apart by several inches or feet. Typically, a sonic signal is transmitted from one longitudinal end of the tool and received at the other, and measurements are made every few inches as the tool is slowly drawn up the borehole. The sonic signal from the transmitter or source enters the formation adjacent the borehole, and the arrival times and perhaps other characteristics of the receiver responses are used to find formation parameters. In most formations, the sonic speeds in the tool and in the drilling mud are less than in the formation. In this situation, the compressional (P-wave), shear (S-wave) and Stoneley arrivals and waves are detected by the receivers and are processed. Sometimes, the sonic speed in the formation is slower than the drilling mud; i.e., the formation is a "slow" formation. In this situation, there is no refraction path available for the shear waves, and the shear waves are typically not measurable at the receivers. However, the shear slowness of the formation is still a desirable formation parameter to obtain.

One sonic log of the art which has proved to be useful is the slowness-time coherence (STC) log. Details of the techniques utilized in producing an STC log are described in U.S. Pat. No. 4,594,691 to Kimball et al., as well as in Kimball, et al., "Semblance Processing of Borehole Acoustic Array Data"; *Geophysics*, Vol. 49, No. 3, (March 1984) pp. 274–281 which are hereby incorporated by reference in their entireties herein. Briefly, the slowness-time coherence log utilizes the compressional, shear, and Stoneley waves detected by the receivers. A set of time windows is applied to the received waveforms with the window positions determined by two parameters: the assumed arrival time at the first receiver, and an assumed slowness. For a range of values of arrival time and slowness, a scalar semblance is computed for the windowed waveform segments by backpropagating and stacking the waveforms and comparing the stacked energies to the unstacked energies. The semblance may be plotted as a contour plot with slowness and arrival times as axes, with maximum semblance values indicating the determined formation slowness value. In addition, local maxima of the semblance function are identified by a peak-finding algorithm, and the corresponding slowness values may be plotted as gray-scale marks on a graph whose axes are slowness and borehole depth. The intensity of the gray-scale marks is proportional to the height of the semblance peak.

As indicated in the aforementioned article and U.S. Pat. No. 4,594,691 to Kimball et al., the same backpropagation and stacking techniques are used regardless of whether the wave being analyzed is a P-wave, S-wave or a Stoneley wave; i.e., regardless of whether the wave is non-dispersive (P- or S- wave) or dispersive (e.g., Stoneley). However, while such backpropagation and stacking techniques may be optimal for non-dispersive waves, they are not optimal for dispersive waves. In response to this problem, at least two different approaches have been utilized. A first approach, such as disclosed in Esmersoy et al., "P and SV Inversion from Multicomponent Offset VSPs", *Geophysics*, Vol. 55; (1990) utilizes parametric inversion of the total waveform. However, this approach is not preferred because it is unreliable and computationally time consuming.

A second approach which is the currently commercial approach to solving the non-optimal results of using the STC techniques for dispersive waves, which is disclosed in A. R. Harrison, et al., "Acquisition and Analysis of Sonic Waveforms From a Borehole Monopole and Dipole Source ...", SPE 20557, pp. 267–282, (Society of Petroleum Engineers, Inc. 1990), and U.S. Ser. No. 07/862,821, which are both hereby incorporated by reference herein in their entireties, is to process the flexural waveform as before, but to correct the non-dispersive processing results by a factor relating to the measured slowness; i.e., to post-process the STC results. In particular, correction values are obtained by processing model waveforms with the STC techniques and comparing the measured slowness with the formation shear slowness of the model. The model waveforms assume a particular source and are bandlimited to a prescribed band (typically 1 to 3 KHz) before STC processing. Tables of corrections are designated by a particular source and processing bandwidth, and contain corrections as percentage-of-measured-value factors functions of measured value and hole diameter. The percentage correction required decreases with hole diameter and increasing formation slowness, and ranges from less than one percent to as much as fifteen percent. This approach, as did the parametric inversion approach, has its own drawbacks. In particular, the waveform spectra often disagree with those of the model. Further, the analysis band may exclude the majority of the flexural mode energy as well as reducing sensitivity to environmental parameters.

Other approaches such as first motion detection of flexural mode onset, and non-dispersive processing over a low frequency band, have also been considered by the applicant and others. Each of these approaches, however, has its own drawbacks. The flexural mode onset approach is driven by the realization that the fastest parts of the flexural mode dispersion curve approaches the formation shear slowness, and that the calculated moveout can be taken as the estimate of formation shear slowness. Problems with this technique include, among others, that: the flexural mode onset can be preceded by the compressional arrival; the early onset of the flexural wave may not propagate at the formation shear slowness because the flexural wave does not have energy at low frequencies; early time portions of arrivals have low energy content; measured flexural mode onsets practically never line up exactly in arrays with several receivers. The non-dispersive processing over a low frequency band approach is driven by the realization that the low frequency limit of the flexural mode dispersion curve is the formation shear slowness. Among the problems with the low frequency processing are that:

with fixed array lengths, the resolution of the slowness measurement diminishes with frequency; generating significant flexural mode energy at low frequencies is extremely difficult; and road noise increases as the frequency decreases.

SUMMARY OF THE INVENTION

It is therefore an object of the invention to provide techniques in slowness logging which account for dispersion during processing.

It is another object of the invention to account for dispersion in slowness logging by backpropagating the received waveforms and accounting for dispersion in the frequency domain.

It is a further object of the invention to provide techniques in slowness logging which provide for processing both dispersive and non-dispersive waves.

Another object of the invention is to provide techniques in slowness logging which are easily and quickly calculated.

A further object of the invention is to provide techniques in slowness logging where an estimate of slowness is used in order to window the received data and in order to initiate a slowness estimation in the frequency domain.

An additional object of the invention is to significantly decrease the computations required for determining formation slowness by utilizing an estimate of slowness in order to initiate a slowness estimation in the frequency domain.

In accord with the objects of the invention, methods and related apparatus for conducting slowness logging are set forth. The methods broadly comprise backpropagating detected dispersive waveforms in the Fourier domain while accounting for dispersion, and then stacking the processed waveforms. The stacking of the processed waveforms may occur in the frequency or time domains. However, in one preferred embodiment, where the data is windowed, the stacking and windowing is accomplished in the time domain. The semblance of the stacked and windowed waveforms may then be compared against the detected waveforms and those results may be used to plot semblance as a function of slowness and time. In accounting for dispersion during backpropagation, a set of different dispersion curves which are a function of formation shear slowness may be utilized, and the determined formation shear slowness is identified when the semblance is greatest. The formation shear slowness may be plotted as a function of formation depth.

In accord with another aspect of the invention, in order to limit the amount of processing required, prior to Fourier transforming the detected waveform, a window position is found by finding a maximum stacked energy at an assumed slowness which was previously determined. Then, only the data in or in and around the window is fourier transformed, thereby reducing significantly the processing required. The Fourier transformed waveforms are then processed, including backpropagation incorporating different dispersion curves which are functions of formation shear slowness. The results for the different backpropagations are then stacked in the Fourier domain, and semblance values calculated. The semblance values may then be tabulated as a function of slowness, with the slowness of maximum semblance being used for a plot of slowness as a function of formation depth.

Additional preferred aspects of the invention include the use dipole sources and receivers in order to produce a large flexural wave signal (the flexural wave being a dispersive wave), and the use of a model for generating the dispersion curves.

The apparatus of the invention relates closely to the methods of the invention.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
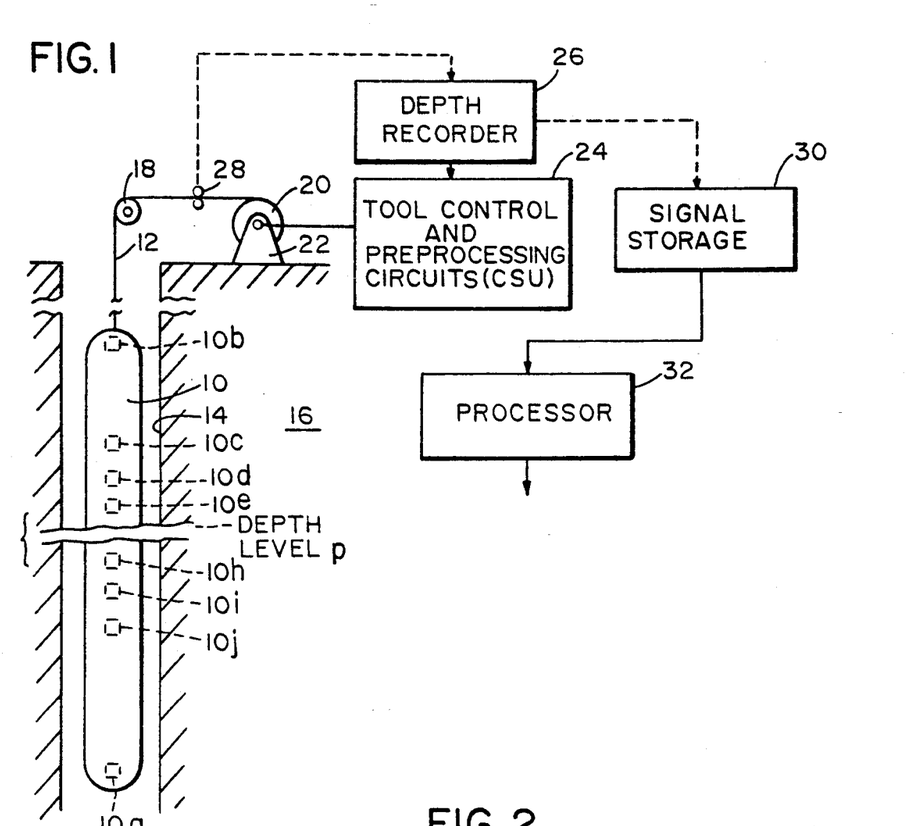
FIG. 1 is an overall schematic illustration of a logging system making use of an exemplary embodiment of the invention.

Referring to FIG. 1, an overall schematic illustration of a well logging system making use of the invention is seen. A sonic tool 10 is shown lowered on an armored multiconductor cable 12 into a borehole 14 (cased or otherwise) to take sonic logs of a subsurface formation 16. Tool 10 is provided with at least one sonic source or transmitter 10a (either monopole or dipole), and a plurality of sonic receivers (either monopole or dipole). In FIG. 1, tool 10 is shown with two transmitters 10a and 10b, and eight receivers 10c through 10j, it being appreciated that this is by way of example only and not intended to be limiting. The receives are spaced along the length of tool 10 from each other and from the transmitter(s), and typically the distance between each transmitter and the receiver closest thereto is much greater than the inter-receiver distance. For example, the distance between the transmitter and the receiver nearest thereto is typically in the range of 5-25 feet, and the inter-receiver distance is typically less than half a wavelength of the sonic signal from the transmitter; e.g., about a half a foot to a foot.

Figure 5:
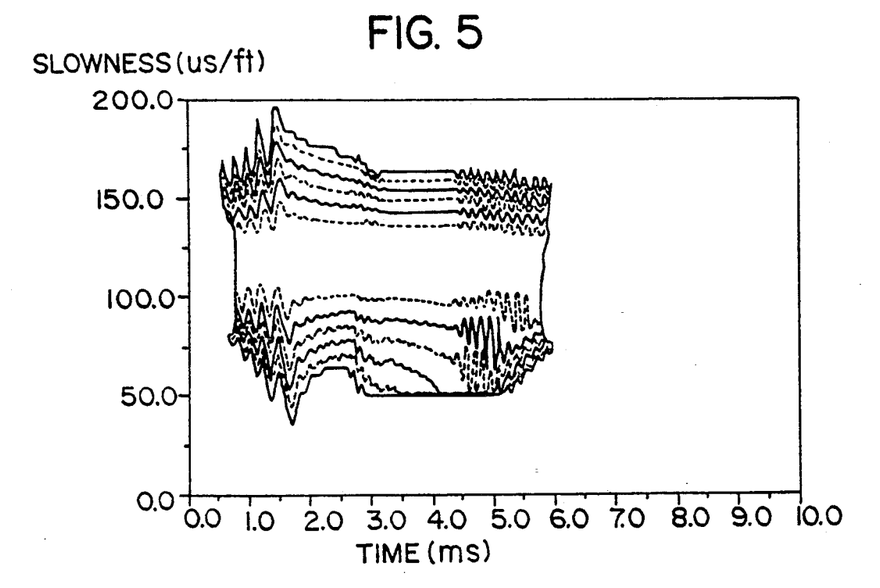
FIG. 5 is an exemplary map of semblance values as a function of slowness and time.
Figure 6:
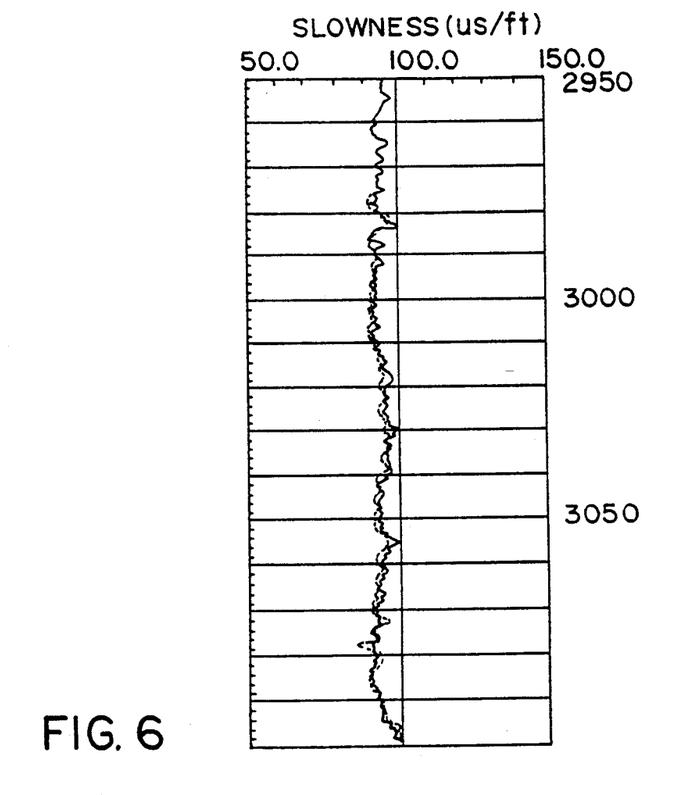
FIG. 6 is an exemplary formation shear slowness log.

Tool 10 is adapted from movement up and down borehole 14, and as the tool 10 is moved, the transmitter 10a periodically generates a sonic signal. The generated sonic signal travels through the borehole and/or through the formation, and the receivers typically detect some energy which results from the generated signal. The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between transmitter 10a (and 10b) and receivers 10c through 10j on the one hand, and the surface equipment on the other hand, is made through suitable multi-element slipping and brush contact assembly 22 associated with the drum and winch mechanism 20. A unit 24 contains tool control and pre-processing circuits which send electrical signals to tool 10 and receive other electrical signals (sonic logs) therefrom via cable 12 and assembly 22. Unit 24 cooperates with a depth recorder 26 which derives depth level signals from depth measuring wheel 28 so as to associate the signals from receiver 10c through 10n with respective depth levels z in borehole 14. The outputs of sonic receivers 10 c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10j in analog form but more typically stores them in the form of digital sonic log measurements, a set for each respective depth level z, derived by digitizing such analog signals, for example in unit 24. Storage 30 can comprise a magnetic storage device such as a disk or tape, and/or other storage media such as semiconductor or equivalent memory circuits. In the case of tool 10 having eight receivers, eight respective waveforms of five hundred twelve digitized measurements each can be produced for every six inches of borehole, which translates to many millions of digitized log measurements for the typical borehole which is several thousands feet deep. Thus storage 30 should preferably have the capacity appropriate for the task. The processing of the digitized log measurements is then accomplished by a computer or processor 32 which processes the information according to the techniques set forth below with reference to FIGS. 3a and b. The output of the processing is preferably a log of formation slowness versus formation depth z as seen in FIG. 6. In addition, maps of semblance values as a function of slowness and time at particular depths may also be output such as seen in FIG. 5.

Figure 2:
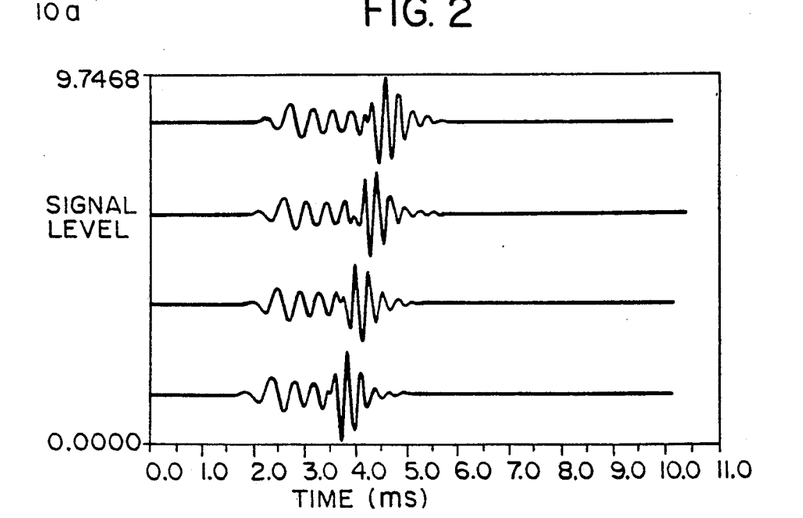
FIG. 2 illustrates waveforms of sonic signals received at a set of sonic receivers spaced from each other along the length of a sonic tool and from a transmitter carried by the same tool.

The response of any given one of receivers 10c through 10j to a sonic signal from transmitter 10a (or 10b) is typically a waveform of the general type illustrated in FIG. 2. As seen in FIG. 2, the responses of the several receivers are staggered in time due to the different spacing of the receivers from the transmitter. It will be appreciated that where the sonic signal detected is non-dispersive (e.g., P-waves and S-waves), the signal obtained at each receiver will take the same or similar form. However, where the sonic signal is dispersive (e.g., Stoneley and flexural waves), the signal obtained at the different receivers will appear different. Thus, the waveforms shown in FIG. 2 are illustrative of a dispersive wave. As discussed in more detail hereinafter, the primary waves of interest in the instant invention are the dispersive waves, such as the Stoneley and flexural waves.

As mentioned in the Background section, in slow formations, it is possible that a shear wave signal is not detected by the receivers. Without a shear wave signal detection, a direct measurement of formation shear slowness is not possible. However, the formation shear slowness may be determined from other measurements as it is related to other parameters according to the following:

$$S_F(f) = \text{Stoneley } (D, V_p, V_s, R_{form}/R_{fluid}, V_{fluid}) \quad \text{1(a)}$$

-continued
$$= \text{Flexural } (D, V_p, V_s, R_{form}/R_{fluid}, V_{fluid}) \quad \text{1(b)}$$

where $S_F(f)$ is the phase slowness of the formation, D is the diameter of the borehole, $V_p$ is the P-wave velocity, $V_s$ is the unknown shear wave velocity, $R_{form}$ and $R_{fluid}$ are the densities of the formation and borehole fluid, and $V_{fluid}$ is the borehole fluid velocity. Typically, the borehole diameter, the formation and borehole fluid densities, and borehole fluid velocity are known, may be assumed, or may be determined according to known techniques. Likewise, the P-wave velocity may be determined according to known techniques. As a result, if it is possible to measure the phase slowness of the formation via Stoneley or flexural wave measurements, then a determination of the formation shear velocity or slowness is possible.

Figure 3A:
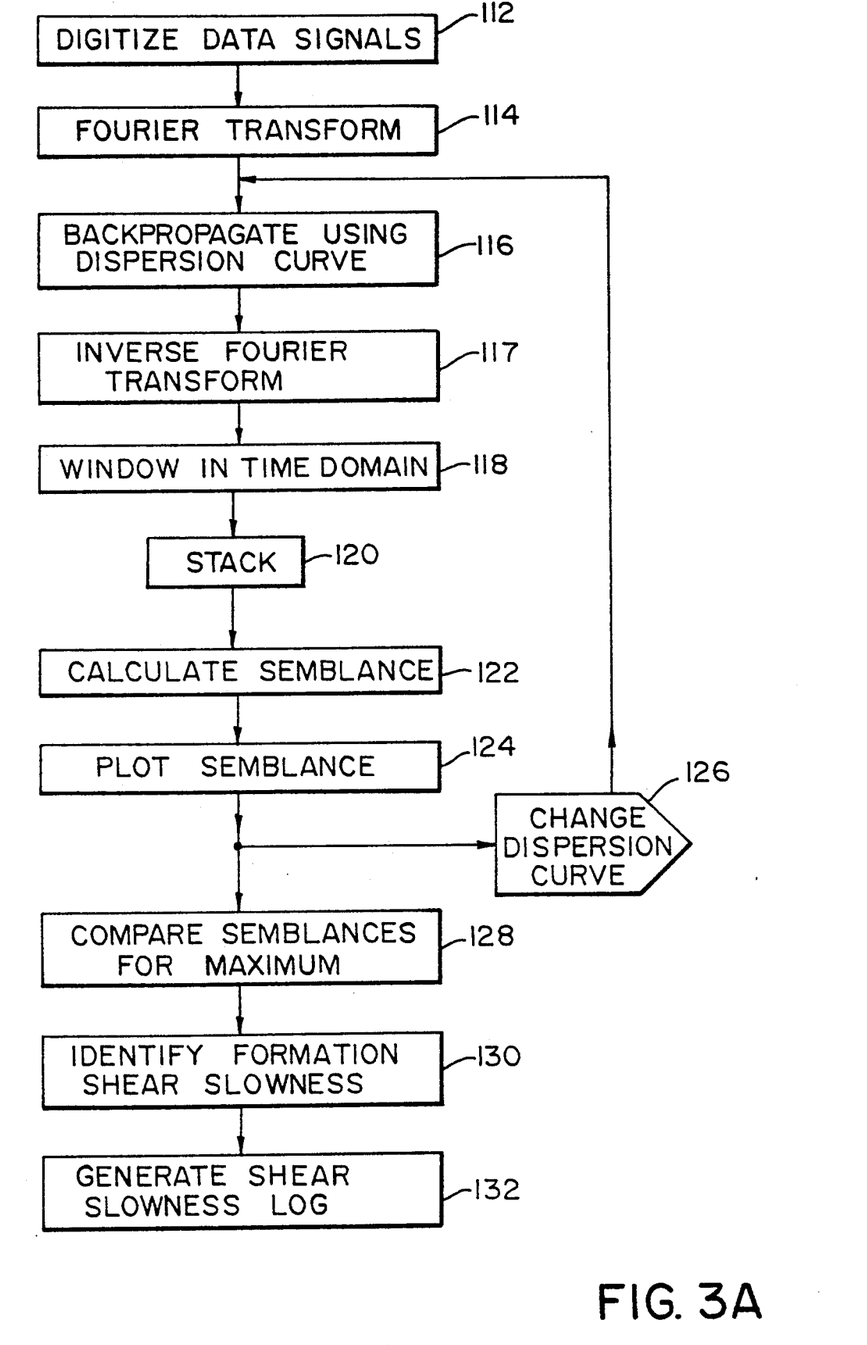
FIG. 3a is a block diagram of the processing accomplished by the processing means of FIG. 1 in accord with a first embodiment of the invention.
Figure 3B:
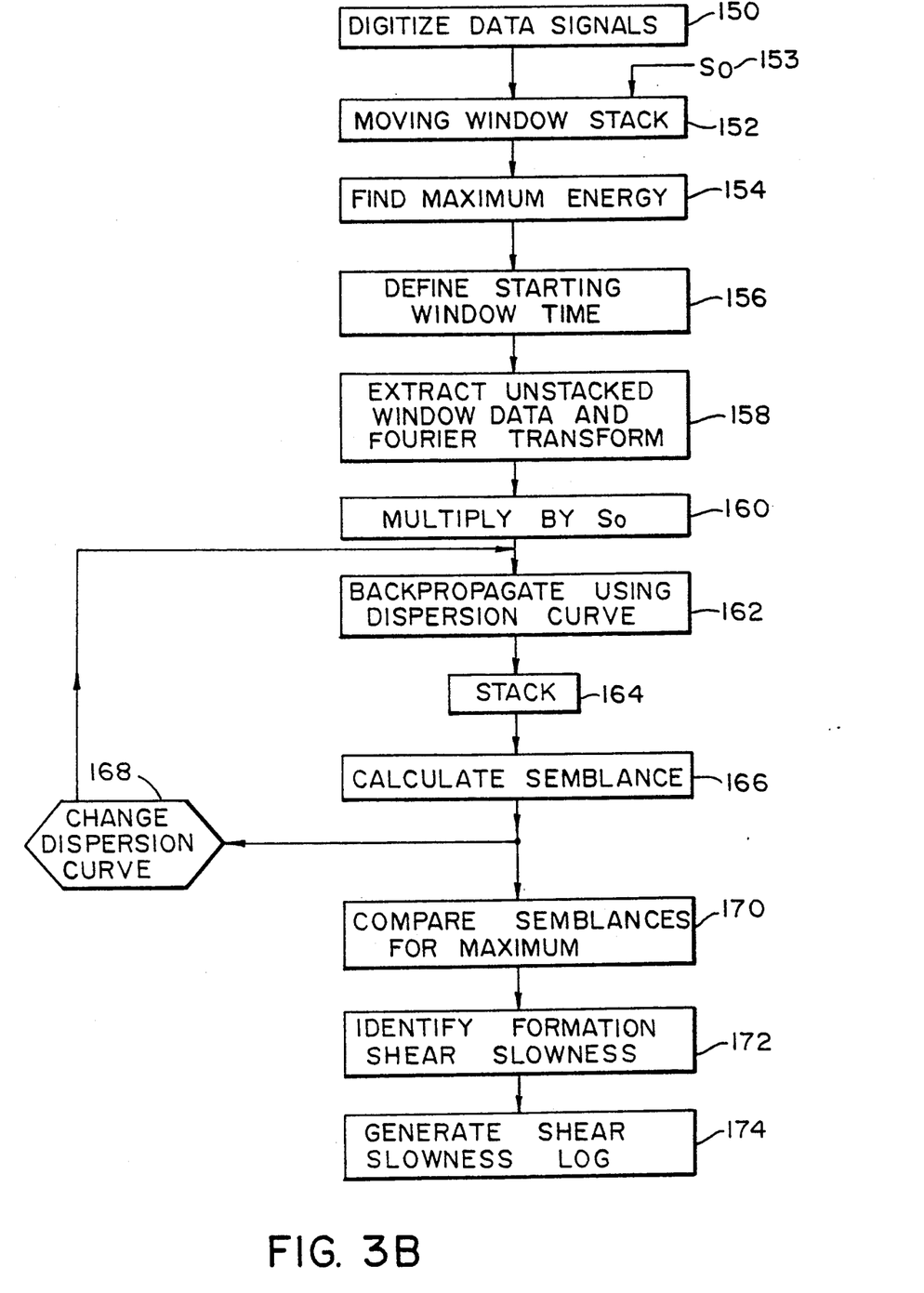
FIG. 3b is a block diagram of the processing accomplished by the processing means of FIG. 1 in accord with a second embodiment of the invention.

Before turning to FIGS. 3a and 3b which set forth the preferred methods of determining phase slowness so that the formation shear slowness may be determined, an understanding of the physics and mathematics governing the invention is helpful. In particular, an understanding of dispersion, and backpropagation and stacking (beamforming) is in order.

When a transmitter of a sonic tool is fired, the receivers measure waveforms representing the total borehole response. Based on experience and mathematical models, certain portions of the total response are identified as a "wave" or "arrival". Ideally, a wave would be an isolated wave packet which moves across the array at a recognizable slowness. Given the total response, the designation of a particular wave is an imprecise concept. In current processing the designation is made by specifying a particular moved-out time window in which certain properties (such as high semblance) are obtained. But the physics provides no assurance that such isolation can be performed. In general a window contains components from many waves, and a particular wave is simply dominant in its window. The transmitter-to-first receiver distance in sonic tools has been selected to facilitate separation of waves of different slownesses by windowing. While the invention preferably assumes that the different types of waves are perfectly isolated by windowing, it will be appreciated that this assumption is not strictly true, and that additional techniques can be utilized to help distinguish between the different types of waves.

A propagating wave is often modeled in terms of its wavenumber $k(f)$ which is, in general, a complex-valued function of frequency. If $A_i(f)$ is the amplitude spectrum of the waveform at the i-th receiver located at distance $z_i$ from the source, then the spectrum of the output $A_{i+1}(f)$ of the i+1-th receiver at a distance $z_{i+1}$ from the source is given by:

$$A_{i+1}(f) = A_i(f) e^{ik(f)(z_{i+1} - z_i)} \quad (2)$$

If the wavenumber $k(f)$ is real, which preferably is assumed for purposes of this invention, then the exponential in equation (2) represents only a phase shift and the wave doesn't attenuate as it propagates. A possible further restriction on the wavenumber $k(f)$ is that it is proportional to frequency; i.e., $$k(f) = 2\pi S f \quad (2a)$$

where S is the slowness of the wave in units of time/distance. If the propagating wave satisfies this restriction, the propagating wave is non-dispersive. Fourier transform relations show that a non-dispersive wave at position $z_{i+1}$ is simply a time shifted (by $S(Z_{i+1}-Z_i)$) version of the wave at position z as discussed above with reference to FIG. 2.

In many applications, a plot of the magnitude of k(f) versus frequency, f, is not instructive. Two more convenient parameters are the phase slowness, $S_P(f)$, and group slowness $S_G(f)$, where:

$$S_P(f) = k(f)/2\pi f \qquad (3)$$

$$S_G(f) = (1/\pi)dk(f)/df \qquad (4)$$

$S_P(f)$ gives the slowness at which the phase of sinusoid at frequency f moves out with distance. $S_G(f)$ gives the slowness at which the envelope of a narrowband signal centered at frequency f moves out with distance. For a non-dispersive wave, $S_P(f)$ and $S_G(f)$ are equal and independent of frequency. For a propagating dispersive wave, $S_P(f)$ is known as the "dispersion curve". While the instant invention, as set forth in more detail below, can utilize and provide results for non-dispersive waves, it will be appreciated that the dispersive waves are of primary interest.

The response of a receiver to a monopole source excitation typically includes a compressional arrival, a non-dispersive shear arrival, and a dispersive Stoneley arrival. Where the source is a dipole source, a flexural mode arrival is typically the dispersive arrival of primary interest rather than the Stoneley arrival as the flexural mode arrival often has the largest energy in the response. For a centered source in a round borehole passing through a homogeneous formation, the flexural mode is effectively non-attenuating and has a dispersion curve $S_P(f)$ which depends on five parameters as set forth above with reference to equation (1b). It is of note that the only length parameter in equation (1b) is the diameter D of the borehole. Thus, if D is multiplied by a factor, and the time scale is multiplied by the same factor, then the velocities $V_p$, $V_s$, $V_f$ are unchanged (as are the slownesses, which are the inverses of the velocities). Thus, if $S_P(f)$ is tabulated as a function of frequency for on hole diameter, then $S_P(f)$ can be found for other hole diameters by interpolation.

In frequency bands of interest, the flexural mode can be highly dispersive; i.e., the phase and group delays can differ significantly. Dispersion-based distortion can easily be misinterpreted as being the result of two arrivals. At low frequencies (e.g., f less than 1.5 KHz), the dispersion is small, and the phase and group slowness are nearly equal to the formation shear slowness S. However, as discussed in the Background section hereto, excitation of the flexural mode at low frequencies is extremely difficult, and low frequency band processing has numerous difficulties.

Figure 4:
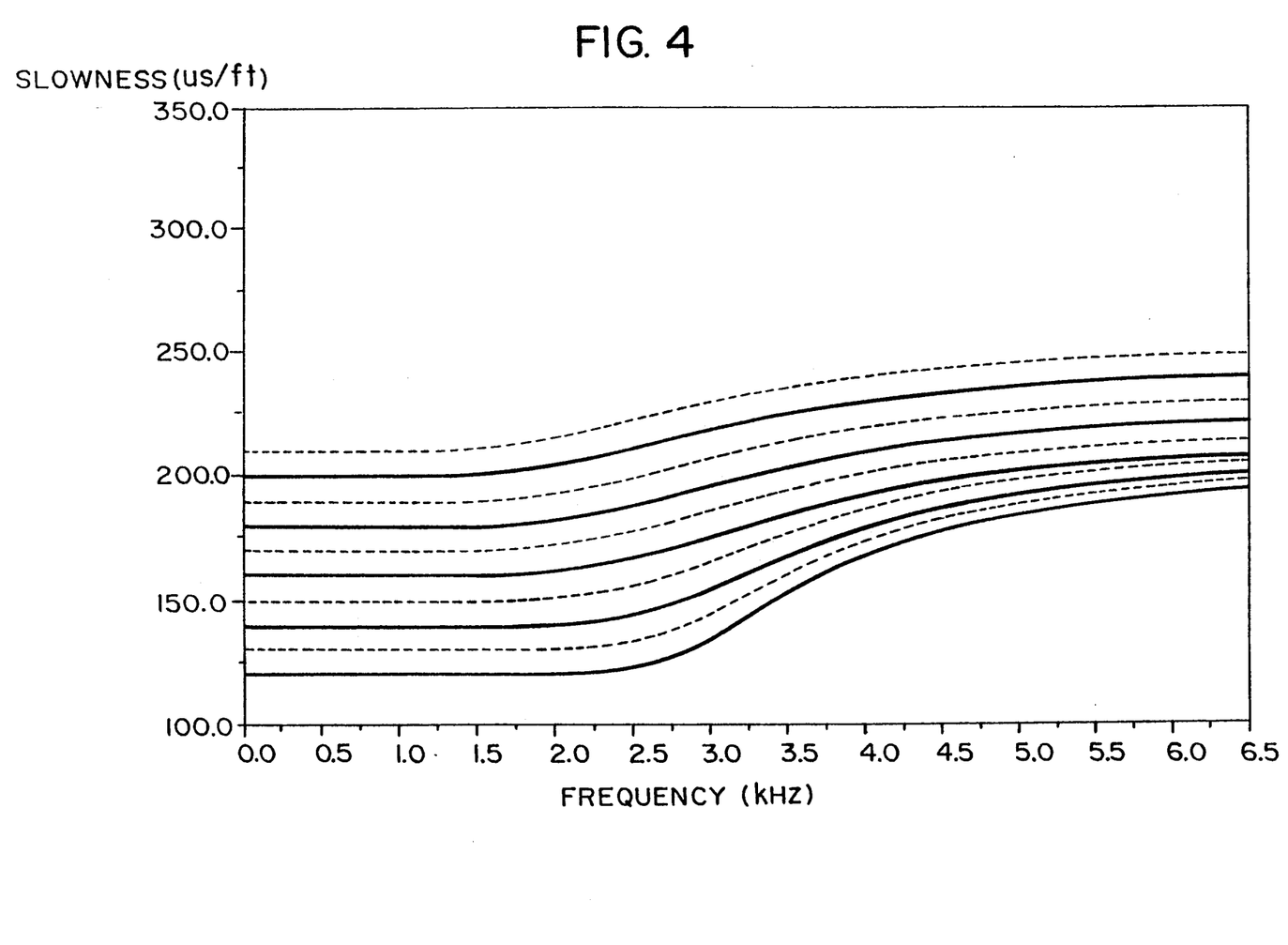
FIG. 4 illustrates a plurality of dispersion curves typical for flexural waves in a borehole.

Because dispersive waves are parameterized by more than one parameter, they are inherently more difficult to process for formation parameters than a non-dispersive wave. For non-dispersive waves, the dispersion "curve" has a constant phase slowness and a one-dimensional processing can estimate the wave slowness. For dispersive waves, the phase slownesses vary with frequency (as seen in FIG. 4) and depend on several formation parameters. Consequently, processing of a dispersive wave requires a multi-dimensional inversion of the data to determine formation parameters. In the case of the dipole flexural mode inversion of up to five parameters (the five parameters of equation 1b) could be attempted. However, for purposes of simplicity, all but the formation shear velocity or slowness is assumed known so that only a one dimensional inversion is necessary.

A summary of semblance and mean-squared error concepts is helpful at this point. If $X_i(f)$ is the complex spectral value at frequency f at the i-th receiver of an array, $i = 1, \ldots, M$, then the average complex spectral value Y(f) over the array is given by $$Y(f) = \frac{1}{M} \sum_{i=1}^{M} X_i(f). \qquad (5)$$

The average energy E(f) in the spectral components is given by $$E(f) = \frac{1}{M} \sum_{i=1}^{M} |X_i(f)|^2. \qquad (6)$$

where E(f) is a positive and real number. The semblance and normalized mean squared error at frequency f are defined by $$\rho(f) = \frac{|Y(f)|^2}{E(f)}, \qquad (7)$$

$$\epsilon^2(f) = \frac{1}{ME(f)} \sum_{i=1}^{M} |X_i(f) - Y(f)|^2. \qquad (8)$$

Semblance is the ratio of the energy of the average spectral value to the average energy, the normalized mean-squared error is the average error between the spectral values and the average, normalized by the average energy. Values of $\rho(f)$ and $\epsilon^2(f)$ at a particular frequency are sometimes called the "point" semblance or the "point" normalized mean squared error at the frequency. Semblance and the normalized mean squared error are simply related by $$\epsilon^2(f) = 1 - \rho(f) \qquad (9)$$

so that minimizing normalized means squared error as a function of a parameter, such as slowness, is equivalent to maximizing the semblance as a function of that parameter.

Given values of $\rho(f)$ and $\epsilon^2(f)$ over a range of frequencies F, the overall semblance and normalized mean-squared error (NMSE) can be found:

$$\rho = \frac{\int E(f)\rho(f)df}{\int E(f)df} \qquad (10)$$

$$\epsilon^2 = \frac{\int E(f)\epsilon^2(f)df}{\int E(f)df} \qquad (11)$$

where the integrations are over a range of frequencies F. For the overall semblance and overall NMSE, $\epsilon^2 = 1 - \rho$. Here, the choice of whether to derive an expression in terms of the semblance or mean-squared error has been made to simplify the derivation.

Turning to the beamforming theory, when a non-attenuating dispersive wave with dispersion curve $S_a(f)$ propagates a linear array of M equally spaced (by a distance $\delta$) receivers, the complex spectrum at the i-th receiver is given by:

$$A_i(f) = A(f)e^{j2\pi f S_a(f)(i-1)} \quad (12)$$

for $i = 1, \ldots, M$. A beamformer has a stacked output $Y(f)$ at a frequency $f$ which is the summation of phase-shifted (by $\theta(f,i)$) receiver spectral values:

$$Y(f) = \sum_{i=1}^{M} A_i(f) e^{j\theta(f,i)} \quad (13)$$

Assume that the data is processed by beamforming based on a second dispersion curve $S_b(f)$; i.e., $$\theta(f,i) = -j2\pi f S_b(f)\delta(i-1) \quad (14)$$

Then, the backpropagated wave for each receiver which takes into account the dispersion curve is:

$$X_i(f) = A_i(f) e^{-j2\pi f S_b(f)(i-1)} \quad (15)$$

Substituting equation (12) into equation (15) yields:

$$X_i(f) = A(f) e^{-j2\pi f (S_a(f) - S_b(f))(i-1)} \quad (16)$$

For the dispersion curve $S_b(f)$, semblance of the beamformer output at frequency $f$ is:

$$\rho_B(f) = \frac{1}{M} \frac{\left| \sum_{i=1}^{M} X_i(f) \right|^2}{M \sum_{i=1}^{M} |X_i(f)|^2} \quad (17)$$

where the numerator of equation (17) is the stack at frequency $f$.

Substituting equation (16) into equation (17) and simplifying the geometric series yields:

$$\rho_B(f) = \frac{1}{M^2} \frac{\sin^2 M\pi f\delta(S_a(f) - S_b(f))}{\sin^2 \pi f\delta(S_a(f) - S_b(f))} \quad (18)$$

From equation (10), the overall semblance for the dispersion curve $S_b(f)$ is the weighted integral of equation (18) over frequency:

$$\rho_B(S_a, S_b) = \frac{1}{UM^2} \int |A(f)|^2 \frac{\sin^2 M\pi f\delta(S_a(f) - S_b(f))}{\sin^2 \pi f\delta(S_a(f) - S_b(f))} df \quad (19)$$

where $$U = \int |A(f)|^2 df. \quad (20)$$

Both integrals are over frequency interval F. Equation (19) contains no approximations. If $S_a(f) = S_b(f)$ for all $f$ then the arguments to the sine functions in equation (19) are zero, and the ratio of the squared sine function is $M^2$, and $\rho = 1$. In other words, if a dispersion curve $(S_b(f))$ has been chosen which matches the actual dispersion curve of the formation, the semblance will be one, and the beamformer error will be zero. It will be appreciated that it is the object of the invention to apply different dispersion curves during the backpropagation so that a dispersion curve which most closely matches the actual dispersion curve of the formation is found. With the dispersion curve found, the shear slowness of the formation can be determined.

It will be appreciated that equation (19) can be simplified by making a Taylor series expansion around the argument of the sine functions of equation (19), and utilizing the first and, if desired, the second Taylor series terms.

The mathematics which helps define the preferred processing of the received waveform data so as to account for dispersion during the backpropagation process is best understood by reference to the standard STC processing. In particular, standard non-dispersive STC processing calculates the semblance over a two dimensional grid of slowness, S, and window starting time, T, according to:

$$\rho(S, T) = \frac{1}{M} \frac{\int_{T}^{T+T_w} \left| \sum_{i=1}^{M} a_i(t + S(i-1)\delta) \right|^2 dt}{\sum_{i=1}^{M} \int_{T}^{T+T_w} |a_i(t + S(i-1)\delta)|^2 dt} \quad (21)$$

where $a_i(t)$ is the output time waveform from the i-th receiver, $i = 1, \ldots, M$, $\delta$ is the inter-receiver spacing, and $T_w$ is the time window length. In commercial processing, $T_w$ is different for monopole and dipole waveforms. Contour plots of $\rho(S,T)$ are a widely used analytic tool and are called ST plots. For logging, STC processing performs a constrained search on $\rho(S,T)$ over the slowness-time plane, identifying local maxima as arrivals, and outputting their slowness coordinate. Implementation of STC is traditionally done in the time domain for computation speed.

In accord with the invention, equation (12) can be viewed in a more general way be recognizing that the time shifted waveforms $a_i(t+S(i-1)\delta)$ are backpropagated versions (at a non-dispersive slowness, S) of the received waveforms $a_i(t)$. If the Fourier transform of $x(t)$ is indicated by $F[x(t)] = X(f)$, and the inverse Fourier transform is denoted by $F^{-1}[X(f)]$, then if $A_i(f) = F[a_i(t)]$, by the Fourier time shifting property:

$$a_i(t+S(i-1)\delta) = F^{-1}[A(f_i) e^{-j2\pi f S(i-1)\delta}] \quad (22)$$

The term in the brackets on the right hand side of equation (22) is the backpropagated spectrum $X_i(f)$ of equation (15) for a non-dispersive wave of slowness S.

Generalizing equation (22) to allow backpropagated by a dispersive wave is accomplished by replacing S with a dispersion curve $S_P(f,S)$ parameterized by S. This can be done for the flexural (or Stoneley) mode if the other parameters are known as assumed above. Thus, $$x_i(t) = F^{-1}[A_i(f) e^{-j2\pi f S_P(f,S)(i-1)\delta}] \quad (23)$$

Replacing $a_i(t+S(i-1)\delta)$ in equation (21) with $x_i(t)$ gives the semblance for the STC processing according to the invention which accounts for dispersion in the backpropagated process, such that:

$$\rho(S, T) = \quad (24)$$

$$\frac{1}{MU(S,T)} \int_{T}^{T+T_w} \left| F^{-1}\left[ \sum_{i=1}^{M} A_i(f) \exp^{-j2\pi f S_P(f,S)(i-1)\delta} \right] \right|^2 dt,$$

where $$U(S, T) = \sum_{i=1}^{M} \int_{T}^{T+T_w} |F^{-1}[A_i(f) \exp^{-j2\pi f S_P(f,S)(i-1)\delta}]|^2 dt, \quad (25)$$

This procedure will be known as dispersive STC or DSTC. It will be appreciated that if $S_F(f,S)=S$, then equations (21) and (24) are the same; i.e., equation (24) reduces to equation (21). In other words, if the dispersion curve is constant (i.e., the wave is non-dispersive), then backpropagation proceeds according to the prior art model. Thus, other than the dispersion curves, the invention which accounts for dispersion in the backpropagation preferably introduces no new parameters and is therefore completely compatible with existing plotting and peak-finding utilities as described in U.S. Pat. No. 4,594,691.

Because the DSTC processing according to equation (24) requires an inverse Fourier transform for each slowness S in order to invert the averaged spectrum, and an inverse transform of each backpropagated waveform in order to calculate U(S,T), if the slowness grid contains $N_S$ slowness points, then more than $(M+1)N_S$ inverse Fourier transforms are required for each frame of data. While such processing is practical, it will be appreciated that faster processing is desirable.

The intensive processing required by DSTC is incurred in returning the backpropagated spectra to the time domain for time windowing. If time windowing is eliminated; i.e., if the entire waveform at each receiver is used, then the semblance can be calculated entirely in the frequency domain with a great time savings. Without time windowing, equation (24) simplifies to:

$$\rho(S) = \frac{1}{M} \frac{\int \left| \sum_{i=1}^{M} A_i(f) e^{-j2\pi f S_F(f,S)(i-1)\delta} \right|^2 df}{\sum_{i=1}^{M} \int |A_i(f) e^{-j2\pi f S_F(f,S)(i-1)\delta}|^2 df}, \quad (26)$$

where the integrations are over the frequency band F. In equation (26) the waveforms are Fourier transformed only once. Further the denominator in equation (26) does not depend on $S_F(f,S)$ and need only be computed if a semblance quality measure is desired. This technique is called unwindowed DSTC and is typically ten times faster then standard STC processing.

The ability to quickly process waveforms using model dispersion curves is the advantage of unwindowed DSTC. However, the processing time advantage of unwindowed DSTC is only an advantage if the results are accurate, and this would appear to depend on whether the waveforms contain only the flexural mode data or whether they also include other arrivals or noise. In order to gain the advantages of unwindowed DSTC without losing accuracy due to other arrivals or noise, a second embodiment of the invention (called "Quick DSTC" or QDSTC) which also accounts for dispersion in the backpropagation is set forth.

According to the Quick DSTC embodiment, only that part of the data that is within a linearly-moved-out time window is processed. The moveout of this window corresponds to an initial estimate $S_0$ of the arrival slowness. The starting time, $T_0$ is for the window is found by a search process. The windowed data is processed in a manner analogous to unwindowed DSTC.

More particularly, QDSTC starts with an initial slowness estimate $S_0$ which may be obtained in any desired manner. For example, the DSTC procedures discussed above may be used to provide an initial slowness estimate, or any of the prior art procedures may be utilized. Given the initial slowness estimate, $S_0$, the time origin $T_0$ of the window is determined through a search called a time scan. The starting time $T_0$ is chosen so as to maximize the stacked energy $E_S(S_0, T)$ over a restricted time interval. Stacked energy rather than semblance is the default variable to be maximized because flexural mode is typically the highest energy arrival in the waveforms. The stacked energy at non-dispersive slowness $S_0$ and window starting time T is defined by $$E_S(S_0, T) = \int_T^{T+T_w} \left| \sum_{i=1}^{M} a_i(t + S_0(i-1)\delta) \right|^2 dt \quad (27)$$

$T_0$ is defined as the window starting time T which maximizes $E_S(S_0,T)$ subject to the constraints $T_{start}(S_0) \leq T \leq T_{last}(S_0)$. The constraints $T_{start}(S_0)$ and $T_{last}(S_0)$ specify a time interval about the slowness-time line $T=SZ_{TR}$ where $Z_{TR}$ is the transmitter-to-first-receiver spacing in feet:

$$T_{start}(S_0) = S_0 Z_{TR} - T_{offset} \quad (28)$$

$$T_{last}(S_0) = (S_0 Z_{TR} - T_{offset}) + T_{width}$$

where $T_{offset}$ and $T_{width}$ are time scan parameters and are analogous to the T limits in the STC peak-finding algorithm.

It should be appreciated that instead of maximizing the stacked energy $E_S(S_0,T)$, semblance $\rho(S,T_0)$ may be maximized, particularly for low level signals such as monopole compressional arrival.

Assuming that $S_0$, and $T_0$ have been found, then the windowed waveforms $w_i(t)$ are given by:

$$w_i(t) = a_i(t + (T_0 + S_0(i-1)\delta)) \quad (29)$$

for $t=0, \ldots T_w$. If the Fourier transform of $w_i(t)$ is $W_i(f)$, then a power-of-two Fourier transform (FFT) computes $W_i(f)$.

The model dispersion curves $S_F(f,S)$, cannot be applied directly to $W_i(f)$ as in equation (21) because these spectra include the non-dispersive moveout at slowness $S_0$ introduced by the windowing operation of equation (29). The spectra of the windowed data after correcting for this moveout are:

$$w_i^D(f) = w_i(f) e^{2\pi f S_0(i-1)\delta} \quad (30)$$

Assuming the dispersion curve at slowness S is given by $S_F(f,S)$, the QDSTC semblance is given by:

$$\rho(S) = \frac{1}{MU} \int \left| \sum_{i=1}^{M} W_i^D(f) e^{-j2\pi f S_F(f,S)(i-1)\delta} \right|^2 df, \quad (31)$$

where $$U = \sum_{i=1}^{M} \int |W_i^D(f) e^{-j2\pi f S_F(f,S)(i-1)\delta}|^2 df \quad (32)$$

The integrals of equations (31) and (32) are over the frequency range $F=[f_{lower} \ldots f_{upper}]$. U isn't a function of $S_F(f,S)$, and is only needed to yield semblance as a normalized quality control measure or to provide a signal level indicator. In practice, calculation of U requires negligible processing time.

Because calculation of the dispersion curves $S_F(f,S)$ for the dipole flexural mode is time-consuming, preferably at least one set of precomputed dispersion curves such as seen in FIG. 4 are kept in digital form in memory. As seen in FIG. 4, the set of curves contains the phase slownesses $S_P(f,S)$ as a function of frequency f for a range of formation slowness; e.g., from fifty to one thousand microseconds/ft in two microsecond/ft steps. A different set of curves for each different type or propagating wave may be kept. Thus, a different set of dispersion curves would be used for flexural waveforms as opposed to Stoneley or other dispersive type waveforms. In addition, a set of dispersion "curves" for non-dispersive waveforms may be stored based on equation (2a) and (3) above.

Typically, for the flexural mode, the dispersion curves are computed for a fixed hole diameter (D), e.g., of twelve inches. During processing, the $S_P(f,S)$ curves are interpolated to the actual hole diameter as discussed above by a quadratic fit to a plurality (e.g., five) frequency points. In other words, the five precomputed points nearest the desired frequency are fitted with a quadratic, and $S_P(f,S)$ at that frequency is found from the quadratic. Preferably, the flexural mode dispersion files are parameterized by the fluid slowness $S_f$, the formation/fluid density ratio R, and either the formation compressional slowness $S_c$ or the $V_P/V_s$ ratio.

The maximization of $\rho(S)$ over formation slownesses takes into account the initial slowness estimate $S_0$ and the fact that the dispersion curves $S_P(f,S)$ are available only over a fixed grid of slownesses. QDSTC performs a two stage search process. The first stage is over formation slownesses separated by a discrete steps (e.g., eight microseconds/ft) starting at $S_0$. The maximum is found by locating the peak of $\rho(S)$ within a five point slowness interval. Location is achieved by a search starting at the initial slowness estimate and moving at most a predetermined number (e.g., ten) discrete steps towards the maximum semblance. Failure to find a maximum produces an error. With the maximum within a five point slowness interval, a quadratic is fitted to the five points and the slowness corresponding to the semblance maximum is found from the fitted quadratic. The second stage repeats the process over a finer grid (e.g., two microseconds/ft grid), starting at the slowness found in the first stage, this time constrained to a fewer number of steps (e.g., two two microseconds/ft steps). The slowness of the semblance maximum for the second stage is the QDSTC slowness estimate S, and the semblance is the QDSTC output semblance $\rho_{QDSTC}$. Thus, S and $\rho_{QSTC}$ are the result of interpolating $\rho(S)$ on a two microsecond/ft interval.

An option to decimate the data in time before processing in the frequency domain is included in QDSTC. The usual sampling interval is forty microseconds and has a Nyquist frequency of 12.5 KHz. In many instances, dipole mode data contains very little energy above 6.25 KHz, and a reduction in sampling rate through decimation is possible. Since the slowness estimation takes place in the frequency domain from $f_{lower}$ ... $f_{upper}$, the frequency content of the signal is important only as it effects the value of $T_0$ found during window positioning of each set of data.

QDSTC is faster than unwindowed DSTC primarily because the window duration, $T_w$ is shorter than the data itself; i.e., fewer data samples must undergo Fourier transform. In addition, QDSTC replaces the two dimensional search over the ST plane of DSTC and STC with two one-dimensional searches. The first one-dimensional search is over T to locate the window, and the second is over S to estimate formation slowness. Since the initial slowness estimate, $S_0$ may not be correct, the window might not be properly located, causing an error in the slowness estimate S. A reapplication of QDSTC on the same data using S from the previous QDSTC processing as the initial slowness estimate $S_0$ is called "rewindowing". In other words, rewindowing takes a QDSTC slowness estimate from a frame and reapplies it to the same frame. Rewindowing is intended to reduce the effects of window positioning errors.

Another technique of the invention is "bootstrapping". If $S_0(i)$ is the input initial slowness for the processing of the data at dept i, bootstrapping provides method of obtaining the input initial slowness at depth $i+1$. In particular, at the conclusion of a QDSTC processing, an error flag can be provided to indicate whether an error occurred such as failing to find a maximum semblance as mentioned above. In bootstrapping, the initial slowness estimate $S_0(i+1)$ is only updated for the next frame $(S_0(i+1))=S(i)$ only if no errors occurred in the QDSTC processing at stage i, and $\rho_{QDSTC}(i)$ is greater than or equal to a threshold value (preferably 0.8). Otherwise, the initial slowness estimate isn't updated; i.e., $S_0(i+1)=S_0(i)$.

Based on the physics and mathematics set forth above, and turning now to FIG. 3a, a block diagram according to a first embodiment of the invention (DSTC) is seen for processing with processor 32 the information obtained by the sonic receivers 10c-10j. In the processing of FIG. 3a, it is assumed that the source 10a is a dipole source, that the sonic receivers 10c-10j are dipole receivers, and that the flexural wave is of primary interest. In accord with the first preferred embodiment of the invention, at least seven, and preferably all eight of the eight digitized data signals of 112 are Fourier transformed at 114 (via a fast Fourier transform—FFT) to provide eight frequency domain spectra. Each of the eight frequency domain spectra are then backpropagated at step 116 according to equation (15) where a first dispersion curve $S_a(f)$ is utilized in the backpropagation. The parameters of the first dispersion curve are preferably stored in memory, and typically provide a dispersion curve in the form of a curve such as one of the curves seen in FIG. 4. The results of the backpropagations are then preferably retransformed into the time domain via an inverse FFT at step 117 to provide backpropagated signals which accounts for dispersion. At step 118, results are windowed to remove the effects of other waves such as P-waves, and at step 120, the windowed data for the detectors are stacked according to the numerator of equation (17). Then the overall semblance for the first dispersion curve is calculated at step 122 and stored. If desired, at step 124, the semblance as a function of the particular slowness and time may be plotted. In this manner the start (i.e., a section) of a plot similar to the plot of FIG. 5 is generated.

In order to find the formation slowness, it is desirable that the backpropagation step 117 be repeated for a plurality of different dispersion curves (e.g., $S_b(f)$, $S_c(f)$ ...). Thus, a loop is shown, where the dispersion curve is changed at step 126. For each different dispersion curve, the results of the backpropagation are preferably retransformed into the time domain prior to windowing and stacking. The overall semblances for each dispersion curve are then calculated at step 122 and stored, and if desired, plotted at step 124 to finally generate a complete plot similar to that of FIG. 5. Then, after all desired backpropagations have been completed, at step 128, the different stored semblance are compared to find a maximum. The maximum semblance corresponds to the dispersion curve which best models the formation. From the identified best dispersion curve, the formation shear slowness is identified at step 130. If desired, a log of shear slowness over borehole depth z such a seen in FIG. 6 is generated at step 132.

It will be appreciated that some of the steps of FIG. 3a may be varied. For example, it is not absolutely necessary to window the backpropagated results prior to stacking (i.e., unwindowed DSTC). Thus, it is possible to stack in the Fourier domain, and to find semblances so as to identify the best dispersion curve and the formation shear slowness without ever returning to the time domain. Further, it will be appreciated that the processing could be done on Stoneley waves rather than flexural waves. For Stoneley waves, monopole sources and detectors are preferred. In addition, the dispersion curves typically take different forms. In a similar vein, it will be appreciated that processing according to FIG. 3a could be counted on non-dispersive waves such as P-waves or shear waves. In such a case, the dispersion curves utilized in the backpropagation should be constant values.

Turning to FIG. 3b, a block diagram of the preferred processing according to the second preferred embodiment (QDSTC) of the invention is seen. In the QDSTC embodiment of FIG. 3b, at least seven, and preferably all eight of the eight digitized data signals of 150 are stacked at 152 based on a moveout dictated by an assumed slowness $S_0$ input 153 and in accord with equation (27). At step 154, the stacked signals are scanned by a moving or sliding window (e.g., of thirty-two data points) to find a maximum stacked energy for a window of given size. Based on the maximum stacked energy, at step 156 a starting window time is defined, and the windowed waveforms are defined according to equation (29). Based on the windows, the data is extracted; i.e., at step 158, the Fourier transform of the data window of each receiver is taken. It should be appreciated that the data windows are removed in time so that the data which is extracted for each receiver is at a different time relative to the data of an adjacent receiver. Because the extracted data window is based on time-removed windows, at step 160, the Fourier transformed window data is corrected for slowness by multiplying the data by the assumed slowness $S_0$. Then, at step 162, the slowness-corrected extracted data are backpropagated according to a first dispersion curve $S_a(f)$. It should be appreciated that the correction for slowness $S_0$ can be incorporated into the backpropagation procedure if desired. The backpropagated data are then stacked at step 164, and the overall semblance is calculated at step 166. It will be appreciated that the stacking of the backpropagated extracted data is preferably accomplished in the Fourier domain as post-backpropagation-windowing is not required; the windowing having been done prior to backpropagation. Thus, not only is the computation time significantly decreased due to the original windowing which results in many fewer data points being Fourier transformed, but the computation time is significantly decreased because a reverse Fourier transform is not required.

In order to find the formation slowness, it is desirable that the backpropagation step 162 be repeated for a plurality of different dispersion curves (e.g., $S_b(f)$, $S_c(f)$ ...). Thus, a loop is shown, where the dispersion curve is changed at step 168. For each different dispersion curve, the results of the backpropagations are stacked and the overall semblances calculated for each dispersion curve. Then, after all desired backpropagations have been completed, at step 170, the different stored semblances are compared to find a maximum. The maximum semblance corresponds to the dispersion curve which best models the formation. From the identified best dispersion curve, the formation shear slowness is identified at step 172. If desired, a log of shear slowness over borehole depth z such as seen in FIG. 6 is generated at step 174.

While the QDSTC embodiment of FIG. 3b preferably conducts a moving or sliding window search for maximum stacked energy in the time domain prior to Fourier transform and backpropagation, it should be appreciated by those skilled in the art that such a pre-backpropagation windowing is not necessary if some additional processing is tolerable. In particular, a wider window which is not based on a moving search, but which is mot certain to include the desired data could be utilized. That wider window data could then be extracted as discussed above. Alternatively, an even wider window could be utilized which does not include the offsets for the different receivers, but which still includes substantially less than the full data signal of typically five hundred twelve points. The data in this "non-extracted" window could then be Fourier transformed. Because the "non-extracted" window data were not extracted in a time offset manner, there would be not reason to multiply by $S_0$ prior to backpropagation according to the different dispersion curves.

There have been described and illustrated herein methods and apparatus for processing dispersive wave information in order to determine the formation shear slowness. While particular embodiments have been described, it is not intended that the invention be limited thereby, as it is intended that the invention be as broad in scope as the art will allow. Thus, while the invention was described primarily in terms of utilizing dispersive flexural waves and/or Stoneley waves in order to make desired measurements and determinations, it will be appreciated that other dispersive or non-dispersive waves could be utilized. Also, while different details of embodiments for processing the signals obtained by the receivers were described, and numerous equations were set forth for describing the processing, it will be appreciated that other processing methods and equations could be utilized provided that the signals are backpropagated in the Fourier domain and account for dispersion during the backpropagation. Likewise, while particular apparatus were described as preferred, such as a dipole source and eight dipole receivers, it will be appreciated that other types and different numbers of sources and receivers could be utilized. Similarly, it will be appreciated that the processing means for processing the obtained wave signals can take any of numerous forms such as a computer, dedicated circuitry, etc. Therefore, it will be appreciated by those skilled in the art that yet other modifications could be made to the provided invention without deviating from its spirit and scope as so claimed.

What is claimed is:

1. A method for determining a characteristic of a formation traversed by a borehole, comprising:
   a) obtaining signals from a plurality of sonic detectors, which signals include dispersive waveform information;
   Fourier transforming at least a portion of said signals to obtain Fourier transformed signals;

c) backpropagating said Fourier transformed signals utilizing a plurality of dispersion curves to obtain a plurality of sets of backpropagated signals;

d) stacking said backpropagated signals of each set to provide stacked sets;

e) using said stacked sets to determine a formation characteristic.

2. A method according to claim 1, wherein:
said plurality of dispersion curves includes a plurality of different dispersion curves varying as a function of frequency.

3. A method according to claim 1, wherein:
said step of using said stacked sets comprises obtaining semblances for each of said stacked sets.

4. A method according to claim 3, wherein:
said step of using further comprises, finding a maximum semblance, said maximum semblance being associated with a particular dispersion curve, and identifying a formation shear slowness based on said dispersion curve of maximum semblance, wherein said formation shear slowness is said characteristic.

5. A method according to claim 4, further comprising:
repeating steps a) through e) for a plurality of depths of said formation, and plotting said formation shear slowness as a function of depth.

6. A method according to claim 2, further comprising:
prior to said step of stacking, inverse Fourier transforming said plurality of sets of backpropagated signals to provide time domain sets, wherein said stacked sets of steps d) and e) are stacked time domain sets.

7. A method according to claim 6, further comprising:
after inverse Fourier transforming and prior to stacking, windowing said time domain sets to provide reduced time domain sets, wherein said stacked sets of steps d) and e) are stacked reduced time domain sets.

8. A method according to claim 2, further comprising:
prior to said step of using, inverse Fourier transforming said stacked sets to provide stacked time domain sets, wherein said stacked sets of step e) are stacked time domain sets.

9. A method according to claim 8, further comprising:
after inverse Fourier transforming and said step of using, windowing said time domain sets to provide reduced time domain wets, wherein said stacked sets of step e) are stacked reduced time domain sets.

10. A method according to claim 7, wherein:
said step of using said stacked sets comprises obtaining semblances for each of said stacked reduced time domain sets, and said method further comprises plotting said semblances as a function of slowness and time.

11. A method according to claim 9, wherein:
said step of using said stacked sets comprises obtaining semblances for each of said stacked reduced time domain sets, and said method further comprises plotting said semblances as a function of slowness and time.

12. A method according to claim 1, wherein:
said Fourier transformed signals are backpropagated according to $$X_i(f) = A_i(f) e^{-j2\pi f S_P(f,S)(i-1)\delta}$$

where $X_i(f)$ is said backpropagated signal at frequency f and at an i'th of said plurality of sonic detectors, $A_i(f)$ is said Fourier transformed signal at said frequency f and at said i'th detector, $\delta$ is an inter-detector spacing between any adjacent of said sonic detectors, and $S_P(f,S)$ are said plurality of different dispersion curves, where S is an assumed formation slowness.

13. A method according to claim 12, wherein:
said step of using said stacked sets comprises obtaining semblances $\pi(S,T)$ for each of said stacked sets, finding a maximum semblance, and from said maximum semblance associated with a particular dispersion curve, identifying a formation shear slowness, wherein
said semblances $\pi(S,T)$ are obtained for each slowness S and each starting time T according to $$\rho(S, T) = \frac{1}{MU(S, T)} \int_T^{T+T_w} \left| F^{-1} \left[ \sum_{i=1}^{M} A_i(f) e^{-j2\pi f S_P(f,S)(i-1)\delta} \right] \right|^2 dt$$

wherein M is the number of said sonic receivers, Tw is a length of a time window, and U(S,T) is defined according to $$U(S, T) = \sum_{i=1}^{M} \int_T^{T+T_w} |F^{-1}[A_i(f) e^{-j2\pi f S_P(f,S)(i-1)\delta}]|^2 dt.$$

14. A method according to claim 1, further comprising:
prior to Fourier transforming said signals, windowing said signals to provide sets of first reduced signals, which first reduced signals are Fourier transformed, backpropagated, and stacked.

15. A method according to claim 14, wherein:
said step of windowing said signals to provide sets of first reduced signals comprises stacking said signals based on an assumed shear slowness $S_0$, and finding an energy maximum or a semblance maximum of a moving window over said stacked signals.

16. A method according to claim 15, further comprising:
multiplying said Fourier transformed reduced signals at frequency f at the i'th of said detectors by $$e^{j2\pi f S_0(i-1)\delta}$$

prior to or while backpropagating, wherein $\delta$ is an interdetector spacing between any adjacent of said sonic detectors.

17. A method according to claim 16, wherein:
said step of using further comprises, finding a maximum semblance for said stacked sets, said maximum semblance being associated with a particular dispersion curve, and
identifying a formation shear slowness based on said dispersion curve of maximum semblance, wherein said formation shear slowness is said characteristic.

18. A method according to claim 17, further comprising:
repeating said method for a plurality of depths of said formation, and plotting said formation shear slowness as a function of depth.

19. A method according to claim 2, further comprising:
prior to Fourier transforming said signals, windowing said signals to provide sets of first reduced signals, which first reduced signals are Fourier transformed, backpropagated, and stacked.

20. A method according to claim 19, wherein:
said step of providing said signals to provide sets of first reduced signals comprises stacking said signals based on an assumed shear slowness $S_0$, and finding an energy maximum or a semblance maximum of a moving window over said stacked signals.

21. A method according to claim 20, further comprising:
multiplying said Fourier transformed reduced signals at frequency f at the i'th of said detectors by $$e^{j2\pi f S_0(i-1)\delta}$$

prior to or while backpropagating, wherein $\delta$ is an interdetector spacing between any adjacent of said sonic detectors,
said step of using further comprises, finding a maximum semblance for said stacked sets, said maximum semblance being associated with a particular dispersion curve, and
identifying a formation shear slowness based on said dispersion curve of a maximum semblance, wherein said formation shear slowness is said characteristic.

22. A method according to claim 21, further comprising:
repeating said method for a plurality of depths of said formation, and plotting said formation shear slowness as a function of depth.

23. A method according to claim 15, wherein:
said assumed shear slowness $S_0$ is obtained from a formation shear slowness measurement at an adjacent depth in said formation.

24. Apparatus for determining characteristics of a formation traversed by a borehole, comprising:
a) sonic source means for generating substantially non-attenuating dispersive waves;
b) a plurality of sonic receiver means for detecting said non-attenauting dispersive waves generated by said sonic source means, and for generating signals in response thereto;
c) processor means for obtaining said signals, for Fourier transforming said signals to obtain Fourier transformed signals, for backpropagating said Fourier transformed signals utilizing a plurality of dispersion curves, to obtain a plurality of sets of dispersion corrected backpropagated signals, for stacking the dispersion corrected backpropagated signals of each set to provide stacked sets, and for using said stacked sets to determine a formation characteristic.

25. Apparatus according to claim 24, further comprising:
memory means for storing said plurality of dispersion curves, wherein said plurality of dispersion curves vary as a function of frequency.

26. Apparatus according to claim 25, wherein:
said sonic means is a dipole source, and said plurality of sonic receiver means are dipole receivers.

* * * * *